May 18, 1965 E. BRICHARD 3,183,560
INTERMEDIATE FRAME FOR DOUBLE GLASS PANELS
Filed Dec. 12, 1961
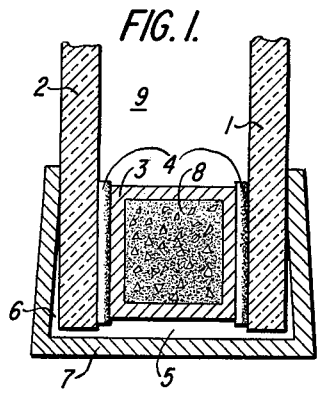
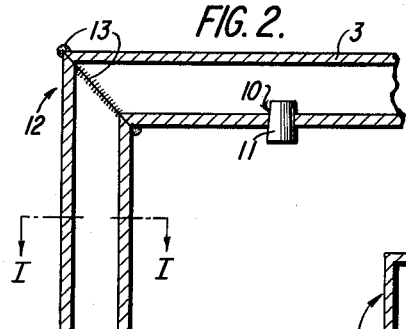
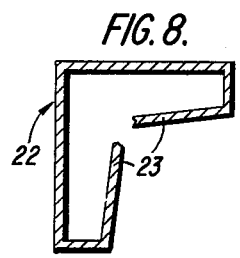
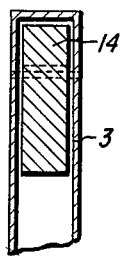
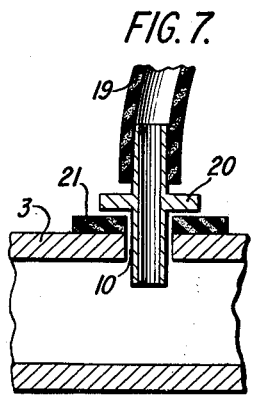
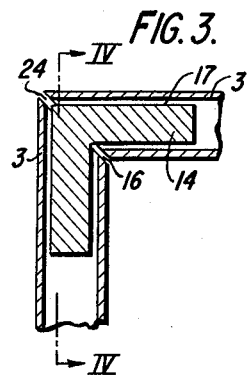
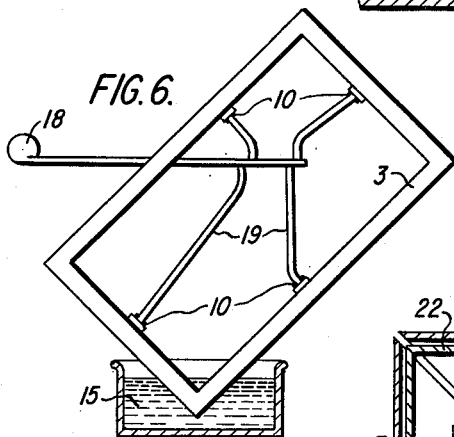
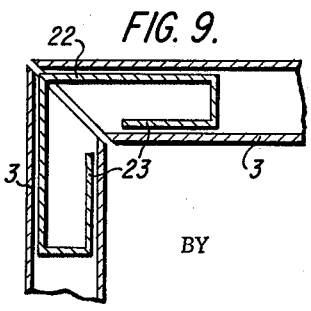
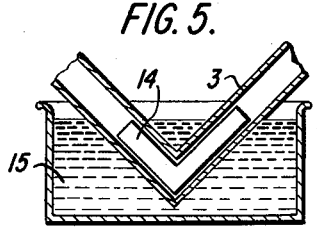
INVENTOR
EDGARD BRICHARD
BY
ATTORNEYS United States Patent Office 3,183,560
Patented May 18, 1965

3,183,560
INTERMEDIATE FRAME FOR DOUBLE
GLASS PANELS
Edgard Brichard, Jumet, Belgium, assignor to S.A.
Glaverbel, Brussels, Belgium, a company of
Belgium
Filed Dec. 12, 1961, Ser. No. 158,845
Claims priority, application Belgium, Dec. 19, 1960,
475,857, Patent 598,320
3 Claims. (Cl. 20—56.5)

The invention relates to a double glass panel unit composed of an intermediate frame and two sheets of glass.

Double glazed window units are known in which the assembly is composed of two glass panes maintained in spaced relationship by the interposition of an intermediate frame which is bonded to such panes by a suitable adhesive or similar product and which constitutes at the same time the sealing means for the space between the two glass panes.

The fitting of the frame, which is often formed of tubes of metal or organic polymers previously filled with a dehydrating product, has been found to be difficult owing to the imperfection of the assembly of the tubes at the corners of the frame. This portion of the assembly is generally a weak point through which the internal space of the glass panel is brought into sufficient communication with the outside that moisture can be introduced and condensation can be deposited on the inner faces of the glass panes.

The present invention has for its object to provide a double glass window panel unit in which complete fluid-tightness of the enclosed spaced is ensured.

In accordance with the invention, the frame intended to act as an intermediate member for the double glass panel is composed of tubular section members, right-angled members inserted in the ends of the section members which form the sides of the frame and a bonding agent filling the interstices between the right-angled members and section members and at the joints of the latter. The right-angled members may consist of metal or a synthetic polymer. They may be solid or they may consist of a strip so bent over as to comprise arms bearing resiliently against the inner walls of the section members of the frame. The bonding agent is either a metal or an alloy serving, for example, for soft soldering, or an adhesive based upon synthetic polymers which are fluid at the time of use.

In order to effect the assembly of the frame, the right-angled members are engaged in the ends of the sides of the frame and made fast with such sides by the introduction of a bonding material which is applied in the fluid state and which fills the interstices at the intersection of the sides, the intersections of the sides of the frame advantageously being successively immersed in the bonding agent while the latter is in the liquid state. Either soft solder or bonding agents based upon synthetic polymers may be employed, depending upon the circumstances. The penetration of the bonding agent into the assembly is promoted by applying a negative pressure within the sides of the frame.

It would also be possible to connect the elements by injecting the bonding agent into the interior of the frame corners or covering the right-angled members with bonding agent before they are introduced into the tubular sections forming the intermediate frame. If the members have been covered with solder, the assembly is heated to the melting point of the solder for example by immersing the corners of the frame in a molten solder bath. Any superfluous bonding agent which may have collected outside the intermediate frame is thereafter removed, for example by scraping.

The accompanying drawing illustrates by way of example a number of embodiments of the invention.

FIGURE 1 is a fragmentary transverse vertical section of a double glass panel embodying the invention.

FIGURE 2 is a sectional view of a part of the intermediate frame in such glass panel.

FIGURE 3 is a sectional view illustrating the parts to be united at one corner of said frame.

FIGURE 4 is a section along the line IV—IV of FIGURE 3.

FIGURES 5, 6 and 7 illustrate the method of soldering the corner parts together.

FIGURES 8 and 9 are sectional views illustrating another embodiment of the invention.

FIGURE 1 of the drawing discloses a double glass panel consisting of two glass panes 1, 2 which are held in spaced relationship by an intermediate frame formed of tubes 3 of square section. The assembly is effected by means of an adhesive or bonding product 4 which may extend over the edge of the enclosed space 5, or even as far as 6. The spaces 5 and/or 6 may be occupied by another appropriate sealing or filling product.

In some cases, the assembly is completed by a frame 7 of U-shape or other appropriate shape, which protects the glass against shock, urges the two glasses against the intermediate frame, if desired, maintains the sealing products in position at 5 and 6, and generally contributes to improving the condition and fluid-tightness of the enclosed space of the assembly.

When the frame 3 is tubular, it may usefully be filled by a dehydrating product 8, the interior of the tubes 3 then being placed in communication with the space 9 between the glass panes through apertures such as 10 (FIGURE 2) to ensure permanent dehydration of the space 9 enclosed by the assembly. The apertures 10 are generally closed by a plug 11 of porous material capable of permitting communication between the interior of the frame 3 and the space 9.

In practice, the formation of the corners 12 (FIGURE 2) of the frame is relatively difficult. In order to ensure fluid-tightness of the enclosed space, in the case of a metallic intermediate frame, the tubes 3 are generally assembled by mitering them and disposing them at an angle of 90° to one another in order that they may be assembled by welding, for example by electric heating, with or without filler. A ridge 13 is formed between the two section members, and this is generally removed by abrasion. This method is likely to impair the joint formed between the two members and to result in the wall being pierced at some point, or in too much material being removed from the ridge. In any case, a passage is thus created for the admission of external moisture which, after some time, will have saturated the dehydrating product 8 and will compromise the good behaviour of the glass panel. It also happens that in the course of subsequent manipulations the welds are subjected to bending forces which break them or lightly crack them, so that imperceptible discontinuities are created. The same difficulties are encountered in forming the corners of intermediate frames formed of tubes of organic polymers which are adhesively assembled.

FIGURES 3 to 7 illustrate by way of example one embodiment of the invention.

According to FIGURES 3 and 4, the intermediate frame is formed of tubes 3 of square section, for example of stainless steel, whose ends are mitered at 45°. Metallic right-angled members 14, whose arms are introduced into the ends of the tubes 3 and maintain the latter in position at 90°, are secured to the latter by means of a soldering operation which is carried out by successively immersing each of the corners in a molten tin solder bath 15 (FIGURE 5), so as to fill the entire space 16 between the two tubes 3, as also the space 17 between the inner walls of the tubes 3 and the right-angled member 14 (FIGURE 3).

The surplus solder adhering to the outer walls of the tubes 3 will thereafter be removed, by scraping or abrasion, or by passing the corner of the frame between two rollers disposed at an appropriate distance apart to roll the still hot surplus solder and to bring it to the appropriate thickness. This thickness-adjusting operation cannot impair the fluid-tightness of the enclosed space, because the solder will not be limited to a thin film between the ends of the tubes 3, but will constitute a continuous mass which cannot be pierced by an abrading operation and which will consolidate the frame thus formed in such manner that it will have much higher resistance to the manipulations to which it is subjected in the course of assembly.

Instead of a molten tin solder bath, it is possible, more especially with intermediate frames and/or right-angled members consisting of organic polymers, to use an appropriate adhesive which has sufficient fluidity at the time of use to be able to penetrate between the inner walls of the tubes 3 and the right-angled member 14 and to fill the interstices between the two tubes 3, as does the solder in the preceding example.

In order to ensure a better penetration of the bonding agent introduced in the liquid state into the space which it is to fill, a light vacuum may also be produced in the tubes 3 at the instant when the corner 12 is plunged into the bonding agent, which will be done, for example, by the method illustrated in FIGURE 6. The orifices 10 are connected to a vacuum pump 18 by flexible tubes 19. Sufficient fluid-tightness is obtained by applying to the orifices 10 the nozzles 20 (FIGURE 7) of the tubes with a packing 21 consisting of very resilient material, for example rubber foam.

A good penetration of the bonding agent may also be ensured by injecting it into the corner through a hole formed in the inside angle of the assembly and covering the joint 24 (FIGURE 3) around its entire free periphery so as to force the bonding agent into the cavities 17.

The right-angled member 14 may be formed either from a simple bar of square cross-section which is bent at a right angle, or from any section member by means of which the two tubes 3 can be joined together, and which leaves between the inner walls of the latter a sufficient space for the penetration of the bonding agent. This will be, for example, a device 22 having a resilient gripping action, of any appropriate form, on to which the two tubes are "threaded" under a light pressure. The tubes are maintained in the assembled position owing to the elasticity of the said device. FIGURE 8 illustrates a possible constructional form of the device 22. The said device consists of a strip so bent as to have slightly divergent arms 23 which, as a result of the deformation which they undergo by their introduction into the tube 3, temporarily maintain the assembly before the soldering, as illustrated in FIGURE 9. The soldering material will fill the internal space of the device 22.

In a modified form, it is also possible to dip the metallic right-angled member 14 or the device 22 into the soft solder bath, before they are introduced into the tube 3. The angle member or device 22 thus becomes coated with an adhering layer of solder. After introduction of the member into the tube 3 and heating of the assembly, the layer of solder melts and adheres to the tube 3. The heating may usefully be effected by dipping the assembly into a bath of molten soft solder by the method hereinbefore described. If an adhesive product is employed, it may be spread on the right-angled members 14 before they are introduced into the intermediate frame 3.

Of course, the invention is not limited to the forms which have been described and illustrated by way of example, and modifications may be made thereto without departing from its scope.

I claim:
1. A double glass panel unit composed of two sheets of glass connected together in spaced parellel relation by sealing means providing an air tight chamber between such glass sheets, said sealing means including a rectilineal frame sandwiched between said glass sheets and constituted of four separate completely tubular frame members composed of metallic material and having abutting beveled ends, each of said tubular frame members being rectangular in cross-section and having two parallel side walls provided with plane exterior surfaces disposed in opposed relation to the inner surfaces of the associated side edge portions of the glass sheets, and having two transverse walls extending across the space between such glass sheets, a right angled member wholly enclosed by and joining the abutting beveled ends of two of said frame members at each corner of said frame, each of said right angled members being constituted of metallic material and substantially completely filling the spaces defined by the associated end portions of the frame members enclosing the same, and each of said right angled members having continuous right angular exterior wall surfaces of widths approximating the widths of and substantially conforming in configuration to the associated interior surfaces of the walls of said frame members and being located closely adjacent to such interior surfaces so that the corners of said right angled members substantially close the transverse joint formed by the abutting ends of the frame members, metal solder material completely filling the spaces between the outer surfaces of said right angled members and the interior surfaces of said frame members, and in the joints between the abutting ends of the side and transverse walls of said frame members, said solder material forming a continuous and uninterrupted bond between the metallic materials of said frame members and right angled members and across said joints, and consolidating said members into a unitary hollow rectangular frame which is fluid tight throughout substantially the entire areas of the walls of said frame, the soldering material in the joints between the side walls of said frame members being substantially flush with the exterior surfaces of such side walls, and two rectangular bands of adhesive material bonding together in fluid tight relation the exterior surfaces of the side walls of said unitary frame and of the solder material in the joints therebetween to said inner surfaces of the side edge portions of the glass sheets, said frame, solder material and said bands of adhesive providing a continuous fluid tight seal entirely around the chamber formed by said glass sheets and frame.

2. A double glass panel unit composed of two sheets of glass connected together in spaced parallel relation by sealing means providing an air tight chamber between such glass sheets, said sealing means including a rectilineal frame sandwiched between said glass sheets and constituted of four separate tubular frame members composed of non-porous material and having abutting beveled ends, each of said tubular frame members being rectangular in cross-section and having two parallel side walls provided with plane exterior surfaces disposed in opposed relation to the inner surfaces of the associated side edge portions of the glass sheets, and having an outer wall extending across the space between such glass sheets at the outer ends of such side edge portions thereof, a right angled member wholly enclosed by and joining the abutting beveled ends of two of said frame members at each corner of said frame, each of said right angled members being constituted of a non-porous material and substantially completely filling the spaces defined by the associated end portions of the frame members enclosing the same, and each of said right angled members having a continuous right angular outer surface of a width approximating the width of the interior surfaces of the outer walls of such associated end portions and being located closely adjacent to such interior surfaces so that the outer corner thereof substantially closes the transverse joint formed by the abutting ends of such outer walls, the configuration of such right angular outer surface substantially conforming to the configurations of said interior surfaces of said outer walls of said associated end portions of the frame members, and bonding material completely filling the spaces between said right angled members and the interior surfaces of the side walls of such associated end portions of said frame members, and between the angular outer surfaces of said right angled members and the interior surfaces of the outer walls of such end portions, and in the joints between the abutting ends of the side and outer walls of said frame members, to consolidate said frame members and right angled members into a unitary hollow rectangular frame which is fluid tight throughout the entire areas of its side and outer walls, at least one of said right angled members being composed of a strip of material of a width approximating the width of the interior surfaces of the outer walls of the end portions of said tubular members and formed to provide a hollow right angled member having resilient elements along the inner walls thereof and bearing against interior surfaces of the inner walls of adjacent end portions of associated tubular members, the interior of said member being filled with said bonding material, and two rectangular bands of adhesive material bonding together in fluid tight relation the exterior surfaces of the side walls of said unitary frame to said inner surfaces of the side edge portions of the glass sheets, said frame and said bands of adhesive providing a fluid tight seal around the chamber formed by said glass sheets and frame.

3. A double glass panel unit such as defined in claim 2, in which the resilient elements on said hollow right angled member constitute the inner walls of the legs of said member and extend toward each other so that the free ends of such elements are in opposed relation at the apex of the angle between such legs.

References Cited by the Examiner

UNITED STATES PATENTS

| | | | |
|---|---|---|---|
| 943,370 | 12/09 | Prahar | 189—78 |
| 1,292,909 | 1/19 | Spery | 113—126 |
| 1,870,284 | 8/32 | Drake | 156—104 |
| 2,342,537 | 1/44 | Geisler | 189—36 |
| 2,625,717 | 1/53 | Wampler et al. | 20—56.5 |
| 2,915,793 | 12/59 | Berg | 20—56.5 |
| 2,927,622 | 3/60 | Butler et al. | 156—305 |
| 2,999,278 | 9/61 | Lauer | 20—55 X |
| 3,030,673 | 4/62 | London | 20—56.5 |
| 3,105,274 | 10/63 | Armstrong | 20—56.5 |

FOREIGN PATENTS 819,693  9/59  Great Britain.

HARRISON R. MOSELEY, *Primary Examiner.*

JEROME SCHNALL, *Examiner.*